United States Patent [19]

Fung et al.

[11] Patent Number: 4,480,046

[45] Date of Patent: * Oct. 30, 1984

[54] REACTIVATION PROCESS FOR IRIDIUM-CONTAINING CATALYSTS USING LOW HALOGEN FLOW RATES

[75] Inventors: Shun C. Fung, Bridgewater; Walter Weissman, Berkeley Heights; James L. Carter, Westfield, all of N.J.

[73] Assignee: Exxon Research & Engineering Company, Florham Park, N.J.

[*] Notice: The portion of the term of this patent subsequent to Apr. 24, 2001 has been disclaimed.

[21] Appl. No.: 511,730

[22] Filed: Jul. 7, 1983

Related U.S. Application Data

[62] Division of Ser. No. 374,976, May 5, 1982, Pat. No. 4,444,895.

[51] Int. Cl.$^3$ .................. B01J 23/96; B01J 23/64; B01J 23/46; C10G 35/085

[52] U.S. Cl. ..................... 502/35; 208/140; 502/36; 502/74; 502/230

[58] Field of Search ............... 502/35, 36, 37; 208/140

[56] References Cited

U.S. PATENT DOCUMENTS

| | | | |
|---|---|---|---|
| 3,622,520 | 11/1971 | Hayes | 252/415 |
| 3,625,860 | 12/1971 | Condrasky | 252/415 |
| 3,904,510 | 9/1975 | Sinfelt et al. | 208/140 |
| 3,937,600 | 2/1976 | Yates et al. | 208/140 |
| 3,939,061 | 2/1976 | Paynter et al. | 208/140 |
| 3,939,062 | 2/1976 | Sinfelt et al. | 208/140 |
| 3,941,682 | 3/1976 | Kmak et al. | 208/140 |
| 3,941,716 | 3/1976 | Paynser | 252/415 |
| 3,943,052 | 3/1976 | Kmak et al. | 208/140 |
| 3,981,823 | 9/1976 | Yates | 252/415 |
| 4,046,673 | 9/1977 | Paynter | 208/140 |
| 4,159,938 | 7/1979 | Lewis | 208/139 |
| 4,172,817 | 10/1979 | Yates et al. | 208/140 |
| 4,359,400 | 11/1982 | Landolt et al. | 252/415 |

FOREIGN PATENT DOCUMENTS

| | | |
|---|---|---|
| 0057551 | 11/1982 | European Pat. Off. |
| 2257337 | 8/1975 | France . |
| 2290953 | 11/1975 | France . |
| 1484372 | 9/1977 | United Kingdom . |
| 1516518 | 7/1978 | United Kingdom . |

Primary Examiner—P. E. Konopka
Attorney, Agent, or Firm—Robert J. North; Edward H. Mazer

[57] ABSTRACT

A process is described for reactivating agglomerated iridium-containing catalysts such as Pt-Ir on $Al_2O_3$ reforming catalyst. The agglomerated catalyst is decoked to remove carbon deposits; treated with hydrogen to reduce metal oxides to the free metals; pretreated with hydrogen halide to provide at least about a 1.3 weight percent halide content; and treated with a low mass flow rate of chlorine of about one gram chlorine per 100 grams catalyst per hour. Use of a low mass halogen flow rate significantly retards ferrous metal corrosion and significantly reduces the quantity of chlorine normally used in achieving high redispersion values.

18 Claims, No Drawings

REACTIVATION PROCESS FOR IRIDIUM-CONTAINING CATALYSTS USING LOW HALOGEN FLOW RATES

This is a division of application Ser. No. 374,976, filed May 5, 1982, now U.S. Pat. No. 4,444,895.

BACKGROUND OF THE INVENTION

This invention relates to a process for reactivating agglomerated iridium-containing catalysts which have been reduced if iridium oxide is present, and pre-treated with a halide-providing compound in which the redispersion of the free reduced metal is accomplished by a low mass flow rate of chlorine.

SUMMARY OF THE INVENTION

It has been found that iridium-containing catalysts containing agglomerated metallic iridium and/or iridium oxides can be efficiently redispersed and reactivated by the combined use of a halide pretreatment step and a halogen redispersion step employing a reduced mass flow rate of halogen gas.

In the halogen redispersion step, a flow rate of about 1 gram halogen and less per 100 grams catalyst per hour, said catalyst taken as coke-free and dry, is effective for this purpose. Ideally, using a flow rate equal to the halogenation rate would result in high redispersion with no unreacted chlorine exiting from the reactor but, this generally would require an inordinate amount of time to achieve. It has been found that mass flow rates of about 1 gram or less of halogen per 100 grams catalyst per hour produce high redispersions with substantially reduced unreacted chlorine. Halogen mass flow rates of about 0.05 to 1.0 grams halogen per 100 grams catalyst per hour are operable in the subject improved process, resulting in metal redispersion values of 60 numerical percent and above, with up to one hundred-fold and greater decrease in the effluent chlorine gas in the process.

The halide pretreatment step is conducted with two limitations, (1) that about 1.3 weight percent halide and above, and preferably 1.4 to 2.5 weight percent halide, taken as the coke-free, fresh, dry catalyst, and most preferably saturated with halide under the conditions used, is present on the catalyst surface after the pretreatment and maintained at, or above this level up to, and during the subsequent halogen redispersion step, and (2) that during the halide pretreatment step, no elemental oxygen is present in the feedstream or is generated, in situ. If this halide level is not maintained during subsequent redispersion and if elemental oxygen is present during the pretreatment, then substantially lower redispersion values will be obtained with concomitant decrease in catalyst metal surface area and activity.

The subject process is applicable to a wide variety of iridium-containing catalysts and particularly to reforming catalysts employing platinum-iridium on alumina which are completely or partially decoked.

Generally, halide-providing compounds are used in the pretreatment step, including organic halides and hydrogen halides, with gaseous hydrogen chloride being the preferred hydrogen halide-providing compound used in the pretreatment, and chloride levels of about 1.3 weight percent of catalyst and above, on the catalyst surface are necessary to insure effective redispersion. The halide weight percent is expressed on the basis of dry, coke-free catalyst.

The pretreatment step is generally conducted in the temperature range of about 250° to 600° C., and the halide weight percentage can be monitored, for example, by X-ray fluorescence versus known standards. Generally, with the exception of very severely coked and agglomerated iridium-containing catalyst, the subject process is capable of producing substantially decoked, highly redispersed, iridium-containing catalyst in a one-cycle treatment.

In accordance with this invention, there is provided a process for reactivating an agglomerated catalyst containing metallic iridium comprising the steps of:

(a) pretreating said catalyst by contact with a substantially elemental oxygen-free atmosphere comprising a halide-providing compound at elevated temperature for a sufficient time to provide about 1.3 weight percent and above halide on the catalyst, taken as the coke-free, dry catalyst; and (b) redispersing the metallic iridium from step (a) by contact with an atmosphere comprising elemental halogen at elevated temperature, at a halogen mass flow rate of less than about one gram of elemental halogen per 100 grams of catalyst per hour.

A further embodiment of the process is where the agglomerated catalyst is further initially iridium oxide which is contacted with a reducing atmosphere at elevated temperature to substantially convert said iridium oxide to metallic iridium prior to step (a).

DESCRIPTION OF THE INVENTION AND PREFERRED EMBODIMENTS

The subject process of the present invention includes a novel reduced halogen mass flow rate in the redispersion step, in combination with a halide pretreatment step, which results in high redispersion values with significantly reduced levels of chlorine in the reactor effluent and eliminates the need, as practiced in the prior art, for rigorous, extended multi-cycle hydrogen/-halogen treatments and expensive large-scale scrubbing equipment for large, unreacted chlorine effluents.

Catalysts which can be treated by the subject process include generally, iridium-containing catalysts, with and without co-catalysts, preferably being supported. Other metallic co-catalysts, which can be present with iridium, which are applicable in the process include metals such as, for example, platinum, rhodium, rhenium, palladium, mixtures thereof and the like. The metals can be present in bimetallic, trimetallic combinations and higher combinations as alloys or physical mixtures, on the same support particles or where the metals are individually present on separate support particles. Preferred metal combinations in the catalyst for treatment by the subject process are platinum-iridium and platinum-iridium-rhenium.

The metals can be supported on a suitable support which is conventional, with the proviso that the support is stable during the pretreatment process and does not undergo any deleterious reactions. Representative examples include silica, zeolites, alumina, silica-alumina, zirconia, alumina-zirconia, mixtures thereof and the like. In general, the active metallic components, if supported, are present in an amount of preferably up to about 10 weight percent of the supported catalysts.

A preferred catalyst which can be reactivated in the process is agglomerated platinum-iridium, preferably supported on alumina.

By the term, "agglomerated catalysts", as used herein, is meant a supported or unsupported catalyst containing metallic iridium singly, or in combination with other metals described herein, in the agglomerated state, sufficient to reduce the catalytic activity of the metal catalyst. The agglomerated metal, e.g., metallic iridium, can be present due to the result of oxygen burn-off of coke deposits producing agglomerated iridium oxide which then must be reduced to metallic iridium by hydrogen gas. Also, hydrogen stripping at high temperature, preferably about 450° to 600° C., will result in partial removal of coke deposits and leave the agglomerated iridium in a metallic state. The metallic iridium in the agglomerated catalyst will undergo effective redispersion by the process described herein. Where the catalyst additionally contains iridium oxide, a hydrogen reducing step is necessary to convert the iridium oxide to metallic iridium prior to redispersion.

The agglomerated metallic iridium-containing catalysts operable in the process can be completely or partially decoked as described above by separate oxygen or hydrogen treat steps or not decoked at all, but simply removed from an on-stream process, e.g., reforming in the presence of hydrogen gas at elevated temperature and subjected to the described process herein.

Agglomerated catalysts which can be treated by the subject process are usually industrially decoked by an oxygen burn-off of carbon deposits. Generally, a typical used catalyst from industrial operation may contain up to about 6 weight percent of carbon deposits and may be agglomerated, after the decoking step, up to about a 100 percent extent, as evidenced by X-ray diffraction. Generally, depending on the conditions used in the coke burn, carbon deposits remaining may be present in about 0.05 to 1.0 weight percent of the catalyst, taken as the dry catalyst. In general, the agglomerates may be greater than about 50 Å and up, to about 100 Å and greater in crystallite size. Decoking of the catalyst may be conducted under a variety of conditions but is generally conducted by heating in an atmosphere containing 0.01 to 10 volume percent $O_2$ at a temperature of about 400° to 550° C., to remove surface and embedded carbon deposits, and particularly "active" carbon deposits which can react with halogen during the redispersion step to form halogenated species which are not readily removed from the catalyst surface. Generally, about 60 to 100 weight percent of carbon deposits can be removed in the decoking step. For example, U.S. Pat. No. 3,904,510, describes a typical procedure employed in decoking. The subject process is applicable to a wide range of decoked agglomerated catalysts containing varying amounts of remaining carbon deposits, different degrees of agglomeration, varying particle size ranges and varying impurities.

An optional first step in the subject process is wherein said partially or completely decoked, agglomerated catalyst is treated with a reducing atmosphere, generally comprising hydrogen gas, to reduce primarily the metal oxides and oxide layers which may be present in agglomerated metallic iridium particles formed during decoking and as a further aid in removing residual active carbon deposits from the decoking step. If no metallic oxides are present, then the reduction step, as described herein, is not mandatory. However, if metallic oxides are present, the reduction step must be conducted in order to achieve high values of redispersion. Other reducing or inert gases may also be present, including nitrogen, helium and the like. The reducing step is generally conducted by contacting the catalyst at an elevated temperature, generally in the range of about 250° to 600° C., preferably about 300° to 540° C., in a reducing atmosphere comprising above about one volume percent or above hydrogen gas for a time to substantially reduce the metal oxides present to the free metal, as evidenced by the absence of metal oxide lines and the appearance of iridium metal lines in the X-ray diffraction pattern. Larger and smaller volume percentages of hydrogen can also be effectively used.

X-ray diffraction patterns taken on fresh iridium-containing catalysts show no lines corresponding to any metal component, which indicates that the metal components are present in very small particle sizes, less than about 50 Å. X-ray diffraction patterns, as taken on the same catalysts used in reforming from which coke has been burned in numerous cycles of use, generally show distinct metal lines which indicate highly agglomerated metal particles of about 10 to 100 weight percent agglomeration of crystallites of about 100 Å and greater. Thus, X-ray diffraction is a useful and convenient technique for measuring the extent of agglomeration, reduction and redispersion of the catalyst in the subject process.

Preferred conditions in the reducing step are the use of hydrogen as the reducing gas, in a reducing atmosphere comprising essentially hydrogen, at a volume concentration of 0.05 to 5 volume percent and a pressure of about 0.1 to 2.0 MPa, and an inert gas carrier such as nitrogen or helium, particularly preferred at a temperature of about 300° to 540° C. for a time sufficient to achieve a substantial reduction of the iridium oxide and other metal oxide to the free metals. By the term "substantially reduce" is meant a reduction in the numerical amount of iridium oxides present by about 75 to 100 percent and preferably about 90 to 100 percent. Generally, time requirements for the reduction will be in the range from about one to several hours depending on the process conditions. Shorter and longer times are also applicable.

Following the reduction step, if performed, the decoked-reduced catalyst is then subjected to halide pretreatment with a halide-providing compound. By the term "halide providing" is meant a compound containing ionically or covalently bound halogen which, under the process conditions, can release the halogen in halide form, preferably as hydrogen chloride, to the catalyst surface. Representative examples include haloorgano compounds and preferably hydrogen halides. Haloorgano compounds include chlorocarbons such as carbon tetrachloride, methylene chloride, chloroform, methyl chloride, 1,2-dichloroethane, hexachloroethane, mixtures thereof and the like. When using haloorgano compounds, hydrogen in a large excess over the stoichiometric amount must also be used to convert the haloorgano compound to a hydrogen halide.

The hydrogen halides can be hydrogen fluoride, hydrogen chloride, hydrogen bromide, or hydrogen iodide. Preferably, hydrogen chloride is the halide-providing compound used in the process. The atmosphere contacting the catalyst in this step can contain other inert gases, e.g., nitrogen and the like, also including water vapor for more uniform distribution of halide on the catalyst surface prior to the halogenation treatment and also preferably, hydrogen gas or reducing gas, in an amount of about 1–2 volume percent, to insure that the reduced catalyst remains in the reduced state during hydrogen halide pretreatment. It is essential that the atmosphere be substantially elemental oxygen-free during the halide pretreatment. Within this context, the halide feedstream should also preferably be elemental halogen-free since it is believed that elemental halogen reacts with surface hydroxyl groups to generate elemental oxygen. However, if chlorine is an impurity in the pretreating step gaseous mixture, then a small amount of hydrogen gas should be added to insure the absence of elemental oxygen being present.

The temperature of the halide pretreatment is generally conducted in the range of about 250° to 600° C. and preferably about 300°–540° C., and the halide-providing compound, at the above-identified temperature, is contacted with the catalyst in a gaseous stream until about 1.3 weight percent halide and above, is provided to the catalyst as detected, for example, by X-ray fluorescence. Preferably, the catalyst is pretreated to a range of about 1.4 to 2.5 weight percent halide or higher, and most preferably up to saturation by halide of the catalyst surface under the process conditions. As described hereinabove, the weight percentage of halide provided to the catalyst is taken on a dry and coke-free catalyst basis. Where the catalyst has been extensively used in commercial processes having a lower surface area and catalytic activity, as a result of this continued use, a minimum weight percentage of about one percent halide is reasonably believed to be effective in promoting high redispersion values in the subject process. For example, fresh catalysts having BET surface areas of 180 $m^2/g$ and higher will require 1.3 weight percent and above halide. Used catalysts having surface areas of about 100 to 180 $m^2g$ will generally require a minimum of 1 to 1.3 weight percent halide prior to redispersion. However, an exact minimum value cannot be stated for a commercial spent catalyst due to large variances in surface area, coke deposits, impurities and poisons present, and the like. One skilled in the art, however, will be able to utilize this disclosure successfully for efficient redispersion. It is important that the halide content be maintained up to halogen redispersion treatment. If a "purge" of hydrogen, nitrogen, water, mixtures thereof, or other materials is used subsequent to the halide pretreatment, then such purge or contacting step should not reduce the halide level to below about 1.3 weight percent. If this happens, then the halide pretreatment should again be conducted to insure about 1.3 weight percent halide being present. This is particularly true in cases where multi-cycle treatment may be necessary in which the weight percent of halide present on the catalyst must be replenished again to about 1.3 weight percent or above, prior to each halogen redispersion treatment.

The halide pretreatment is conducted for sufficient time to achieve a halide loading, as described above. In practice, a fast flowing stream of preferably hydrogen chloride is contacted with the catalyst up to, and slightly beyond breakthrough. By the term "breakthrough" is meant the first visible detection by an analytical method such as, for example, the color change of an acid-base indicator, e.g., phenolphthalein.

Halide pretreatment is conducted to breakthrough to achieve desired halide loading of the catalyst and also to insure a uniform distribution of halide over the entire length of the catalyst bed to prevent "halide gradients", which can lead to non-uniform redispersion. In general, water vapor present in the halide feedstream will tend to lower the halide loading slightly below that compared to a dry halide application by approximately about 0.4 weight percent, but generally results in a more uniform halide distribution. Thus, saturation by dry HCl of a coke-free, dry catalyst will result in up to about a 2.8 weight percent halide loading, whereas saturation with a wet stream of HCl will result in up to about 2.4 weight percent, or even slightly lower, halide loading.

Time required for the halide pretreatment will, of course, be dependent on many factors, including flow rate, hydrogen halide gaseous concentrations, amount of catalyst, and can be desirably adjusted, for example, to run for about 1 to 3 hours per catalyst regeneration in general. Concentration of hydrogen halide can be from 0.05 to about 5 volume percent, or higher, in the feedstream, which can be at a total pressure of about 0.1 to 2.0 MPa. Higher and lower values of both variables can also be used effectively.

Following the halide pretreatment step, the agglomerated catalyst is then subjected to a halogen redispersion step by contacting the catalyst with a stream comprising elemental halogen gas. Elemental halogen gases applicable are fluorine, chlorine, bromine and iodine, with chlorine being a preferred embodiment.

The reduced halogen flow rate redispersion is carried out at a temperature of about 450° to 600° C. and preferably about 500° to 540° C. At this temperature, the halogen gaseous atmosphere is passed at a reduced mass flow rate, over the surface of the catalyst at a mass flow rate of about 1 gram, or less, halogen per 100 grams catalyst per hour, in the range of about 0.05 to 1.0 gram halogen per 100 grams catalyst per hour and preferably about 0.3 grams halogen per 100 grams catalyst per hour, and particularly preferred about 0.1 gram halogen per 100 grams catalyst per hour, said catalyst taken as dry and coke-free.

By carrying out the reduced halogen mass flow rate of the subject process, the effluent chlorine gas is generally decreased about ten-fold, and preferably about one hundred-fold or more, resulting in a significant decrease in corrosion of downstream equipment and a decrease in halogen scrubbing equipment.

The gaseous halogen atmosphere may also contain inert gases such as nitrogen or helium as carrier gases carbon dioxide from combustion processes, and also water vapor for corrosion inhibition and, if present, is in an amount of about 0.05 to 2 volume percent.

The gaseous halogen atmosphere can also contain elemental oxygen as a redispersion aid and, if present, is in an amount of about 0.05 to 25 volume percent. Preferably, elemental halogen is present in a concentration of about 0.2 to 21 volume percent. Preferred is wherein elemental halogen and elemental oxygen are present in a volume ratio of about 0.05 to 10, respectively, and a particularly preferred range is 0.2 to 5 v/v. The presence of elemental oxygen also serves as an aid in removing small quantities of carbon deposits which remain after the initial decoking step.

Halogen redispersion is now generally conducted until breakthrough occurs as evidenced or detected, for example, by a starch-iodide indicator. Generally, this requires about 0.5 to 2 hours of halogen treatment for spent catalyst, which depends upon flow rate, halogen concentration in the feedstream and amount of catalyst. Generally, however, slightly longer times of halogen treatment are required for substantially complete redispersion, as evidenced by the absence of crystalline metal or metal oxide lines, in the X-ray diffraction patterns. Preferably, at a time of about 30 to 90 minutes past breakthrough, i.e., substantially past breakthrough, is necessary for substantially complete redispersion.

Operation past breakthough of halogen is preferred to avoid redispersion gradients along the catalyst bed of redispersed iridium metal. Where gradients are present, usually redispersion levels of iridium metal are high at the front part (entrance) of the reactor but decrease toward the tail (exit) of the reactor.

By carrying out the process described herein, substantially complete redispersions of iridium-containing catalyst is capable of being achieved and particularly those of platinum-iridium on alumina used in hydrocarbon reforming operations. In the latter case, 75 to 100 percent redispersion of both the platinum and iridium agglomerated metals is capable of being achieved in the process. The number of cycles necessary should preferably be one. However, in certain cases, such as where minimum halogen treatment past breakthrough times are desired, multi-cycle treatment may prove necessary with concomitant need for additional pretreatment steps, as described hereinabove.

By the term "substantially complete redispersion" as used herein, is meant redispersion values, as determined by X-ray diffraction of greater than about 55 numerical percent and preferably about 75 to 100 numerical percent of the iridium on the catalyst surface, also including other metals where present.

Apparatus useful for carrying out the subject process will be conventional in the art and whether operating on a laboratory scale, pilot plant, or full commercial plant scale, the apparatus will be obvious to one skilled in the art.

In practice, following successful redispersion of iridium on the catalyst surface, a reduction of halide to about 1.0 weight percent is carried out prior to the actual reforming process since excess halide, at this stage, leads to cracking of the liquid hydrocarbon fraction to undesirably smaller hydrocarbon fragments. This reduction can be accomplished by a wet hydrogen stream, for example, which also serves to convert all of the metal species present after redispersion to the metallic state prior to use in a reforming process.

The following examples are illustrative of the best mode of carrying out the instant invention, as contemplated by the inventors, and should not be construed as being limitations on the scope or spirit of the instant invention.

EXAMPLE 1

Into a quartz, tubular, horizontal reactor was charged about 60 grams of a coke-free, platinum-iridium catalyst in which the iridium was 100% agglomerated. It contained 0.3 weight percent iridium and 0.3 weight percent platinum based on the total weight of the catalyst (BET surface area 200 m$^2$/g). The catalyst was divided into three approximately equal sections with a quartz wool plug as a spacer between the sections. The catalyst in Section 1 was at the entry of the reactor and the catalyst in Section 3 was at the reactor exit. The chloride level on this catalyst was determined to be 0.67 weight percent.

The catalyst was treated with a gaseous mixture of 20 percent hydrogen in helium at one atmosphere for 2 hours at 524° C. At the end of the hydrogen treatment, a gaseous mixture of 1 volume percent hydrogen chloride and 1.4 volume percent water in helium was allowed to contact the catalyst up to a point at which the concentration of hydrogen chloride in the exit gas equaled that in the inlet. At this point, the HCl flow was terminated. Chlorine was then added to the gaseous stream at about 0.9 volume percent at a mass flow rate of about 0.36 grams of chlorine per 100 grams of catalyst per hour. The chlorine and water injections were discontinued at a point in time at which the chlorine concentration in the exit gas reached a steady state concentration. One primary reason of the water addition is to suppress ferrous metal corrosion. The results are given in the Table.

The Table lists results under "% Ir Agglomeration", "% Redispersion" and "Cl$_2$ Mass Flow Rate".

The symbol "I" represents the total initial value of iridium agglomeration, and the terms S-1, S-2, and S-3 represent values obtained after treatment for the catalyst in the first, second and third sections of the catalyst bed. The first section represents the entry section and the third, the exit section.

In a related run, the catalyst was treated exactly as Example 1 except that the mass flow rate of chlorine was 1.45 grams per 100 grams of catalyst per hour. The results are given in the Table as Example 1A.

As is seen by comparing Examples 1 and 1A, lowering the mass flow rate of chlorine from 1.45 to 0.36 increases the percent of metal redispersion, even though the amount of chlorine used in Example 1 was less than that used in the corresponding Example 1A. Chlorine concentration at the exit gas was reduced from 7440 ppm to 6540 ppm. Furthermore, exposure of downstream equipment to chlorine was minimized in Example 1 since the amount of chlorine treatment beyond Cl$_2$ detection had been reduced to 0.18 grams per 100 grams of catalyst. Further reduction in chlorine concentration at the reactor outlet can be achieved at even lower mass flow rate of chlorine by reducing the inlet concentration of chlorine, as is illustrated by Example 2.

EXAMPLE 2

A run was made wherein the reactor described in Example 1, was charged with about 60 grams of the agglomerated coke-free platinum-iridium catalyst described in Example 1.

The catalyst was treated with a gaseous mixture of 20 percent hydrogen in helium at one atmosphere for 2 hours at 524° C. At the end of hydrogen treatment, a gaseous mixture of 0.52 volume percent hydrogen chloride and 0.72 volume percent water in helium was allowed to contact the catalyst up to a point at which the concentration of hydrogen chloride in the exit gas equaled that in the inlet. After stopping the hydrogen chloride flow, chlorine was added to the helium stream at about 0.25 volume percent, at a mass flow rate of 0.073 grams per 100 grams of catalyst per hour. The gas mixture also contained 4.8 volume percent oxygen and 0.50 volume percent water. This treatment was continued for 3 hours. The results are given in the Table.

In a related run, the procedure of Example 2 was employed except that during the HCl treatment, the HCl concentration was 1.13 volume percent and H$_2$O was 1.4 volume percent. Also in the redispersion step, the oxygen concentration was 2.1 volume percent and Cl$_2$ was 1.36 volume percent. A chlorine mass flow rate of 1.98 grams per 100 grams catalyst per hour was employed and the results are listed in the Table as Example 2A.

As is seen from comparing Examples 2 and 2A, complete metal redispersion was obtained at less than one-half the amount of chlorine used in Example 2A. It appears that by lowering the chlorine mass flow rate, a closer balance between the redispersion rate and utilization of chlorine is realized.

EXAMPLE 3

A run was conducted in a verticle reactor consisting of 1½ inch diameter and 42 inch long stainless steel pipe. Into this reactor was charged about 640 grams of the agglomerated coke-free platinum-iridium catalyst described in Example 1.

The catalyst was treated with hydrogen at 65 psig for 2 hours at 521° C. At the end of hydrogen treatment, a gaseous mixture containing 2000 ppm hydrogen chloride in nitrogen was allowed to contact the catalyst up to a point at which the concentration of hydrogen chloride in the exit gas was about 90 percent that of the inlet. After stopping the hydrogen chloride flow, chlorine was added to the nitrogen stream at 500 ppm at a mass flow rate of 0.073 grams per 100 grams of catalyst per hour. The gaseous mixture also contained 1.3 volume percent oxygen. This treatment was continued for about three and a quarter hours. The results are given in the Table below.

Complete metal redispersion was obtained at this low mass flow rate of chlorine. In addition, the low chlorine concentration at the reactor outlet minimized chlorine scrubbing requirement.

TABLE I

| Example | % Ir Agglom. | | | % Redis. | | | $Cl_2$ Mass Flow Rate |
|---|---|---|---|---|---|---|---|
| | I | S-1 | S-2 | S-3 | S-1 | S-2 | S-3 | |
| 1(a)  | 100 | 6  | 17 | 30 | 94  | 83  | 70  | 0.36  |
| 1A(b) | 100 | 30 | 42 | 49 | 70  | 58  | 51  | 1.45  |
| 2(c)  | 100 | 0  | 0  | 0  | 100 | 100 | 100 | 0.073 |
| 2A(d) | 100 | 28 | 16 | 6  | 72  | 84  | 94  | 1.98  |
| 3(e)  | 100 | 0  | 0  | 0  | 100 | 100 | 100 | 0.073 |

(a)Amount of $Cl_2$ treatment to detection (g./100g. cat.): 0.30; Amount of $Cl_2$ treatment beyond detection (g./100g. cat.): 0.18; Concentration of $Cl_2$ [gas at exit (ppm)]: 6540.
(b)Amount of $Cl_2$ treatment to detection (g./100g. cat.): 0.29; Amount of $Cl_2$ treatment beyond detection (g./100g. cat.): 0.24; Concentration of $Cl_2$ [gas at exit (ppm)]: 7440.
(c)Amount of $Cl_2$ treatment to detection (g./100g. cat.): 0.068; Amount of $Cl_2$ treatment beyond detection (g./100g. cat.): 0.15; Concentration of $Cl_2$ [gas at exit (ppm)]: 900.
(d)Amount of $Cl_2$ treatment to detection (g./100g. cat.): 0.17; Amount of $Cl_2$ treatment beyond detection (g./100g. cat.): 0.66; Concentration of $Cl_2$ [gas at exit (ppm)]: 9000.
(e)Amount of $Cl_2$ treatment to detection (g./100g. cat.): 0.02; Amount of $Cl_2$ treatment beyond detection (g./100g. cat.): 0.22; Concentration of $Cl_2$ [gas at exit (ppm)]: 300.

What is claimed is:

1. A process for reactivating an agglomerated catalyst containing metallic iridium comprising the steps of:
    (a) pretreating said catalyst by contact with a substantially elemental oxygen-free atmosphere comprising a halide-providing compound at elevated temperature for a sufficient time to provide about 1.3 weight percent and above halide to the catalyst, taken as the coke-free, dry catalyst; and
    (b) redispersing the metallic iridium from step (a) while maintaining said 1.3 weight percent and above halide provided to the catalyst by contact with an atmosphere comprising elemental halogen and water wherein said water is present in a volume percent range of about 0.05 to 2, at elevated temperature, at a halogen mass flow rate of about one-tenth gram or less of elemental halogen per 100 grams of catalyst per hour for a total halogen amount of up to 0.5 gram halogen per 100 grams catalyst, for a time sufficient to effect about 75 to 100 percent redispersion of said metallic iridium.

2. The process of claim 1 wherein said catalyst is initially present substantially as agglomerated metallic iridium.

3. The process of claim 1 wherein said agglomerated iridium-containing catalyst is present on a catalyst support selected from silica, zeolite, alumina, silica-alumina, zirconia, alumina-zirconia, and mixtures thereof.

4. The process of claim 1 wherein said iridium-containing catalyst further contains a metal co-catalyst selected from platinum, rhodium, rhenium, palladium and mixtures thereof.

5. The process of claim 1 wherein said halide-providing compound is one which generates a hydrogen halide in the presence of hydrogen gas.

6. The process of claim 5 wherein said halide-providing compound is selected from carbon tetrachloride, chloroform, methylene chloride, methyl chloride, 1,2-dichloroethane, hexachloroethane, and mixtures thereof in the presence of hydrogen gas.

7. The process of claim 1 wherein said halide-providing compound is hydrogen chloride.

8. The process of claim 1 wherein said halide is present on the catalyst after step (a) in an amount of about 1.4 to 2.5 weight percent, taken as the coke-free, dry catalyst.

9. The process of claim 1 wherein said catalyst after completion of step (a) is saturated with halide.

10. The process of claim 1 wherein said agglomerated catalyst is platinum-iridium supported on alumina.

11. The process of claim 1 wherein said catalyst is platinum-iridium-rhenium supported on alumina.

12. The process of claim 1 wherein the temperatures in step (a) is in the range of about 250° to 600° C.

13. The process of claim 1 wherein said elemental halogen in step (b) is chlorine.

14. The process of claim 1 wherein said temperature in step (b) is in the range of about 450° to 600° C.

15. The process of claim 1 wherein said catalyst contains iridium oxide which is contacted with a reducing atmosphere at elevated temperature to substantially convert said iridium oxide to metallic iridium prior to or concurrently with step (a).

16. The process of claim 15 wherein said reducing atmosphere comprises hydrogen gas.

17. The process of claim 15 wherein the temperature of said contacting with said reducing atmosphere is in the range of about 250° to 600° C.

18. A process for reactivating a partially or completely decoked agglomerated platinum-iridium on alumina catalyst containing platinum and iridium oxides, comprising the steps of:
    (a) contacting said agglomerated catalyst with a hydrogen atmosphere at a temperature in the range of about 300° to 540° C., and a pressure of about 0.1 to 2.0 MPa, for a sufficient time to substantially reduce said oxides of platinum and iridium to the respective metals;
    (b) pretreating said catalyst from step (a) by contact with an elemental oxygen-free and elemental halogen-free atmosphere comprising hydrogen chloride at a temperature in the range of about 300° to 540° C. and a pressure of about 0.1 to 2.0 MPa for a sufficient time to saturate the catalyst with chloride; and
    (c) redispersing the metallic iridium and platinum while maintaining a saturated catalyst chloride level with an atmosphere comprising elemental chlorine and water in a water volume percent of about 0.05 to 2 at a temperature in the range of about 500° to 540° C., a pressure of about 0.1 to 2.0 MPa, at a halogen mass flow rate of about 0.05 to 0.1 gram halogen per 100 grams catalyst per hour, for a total halogen amount of up to 0.5 gram halogen per 100 grams catalyst, for a sufficient time to effect about 75 to 100 percent redispersion of both metallic platinum and iridium.

* * * * *